(12) United States Patent
Chen et al.

(10) Patent No.: US 9,418,071 B2
(45) Date of Patent: Aug. 16, 2016

(54) METHOD AND SYSTEM FOR AUTOMATICALLY INITIATING A FILE AGGREGATION PROCESS BETWEEN COMMUNICATIVELY COUPLED DEVICES

(75) Inventors: Ming-Fong Chen, Sunnyvale, CA (US); Svetlana Avdanina, Sunnyvale, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 909 days.

(21) Appl. No.: 12/728,137

(22) Filed: Mar. 19, 2010

(65) Prior Publication Data

US 2011/0231420 A1  Sep. 22, 2011

(51) Int. Cl.
*G06F 17/30* (2006.01)

(52) U.S. Cl.
CPC ............................... *G06F 17/30174* (2013.01)

(58) Field of Classification Search
CPC .... G06F 3/067; G06F 9/44505; G06F 9/4411
USPC .............................................. 707/758, 999.1
See application file for complete search history.

(56) References Cited

U.S. PATENT DOCUMENTS

| | | | |
|---|---|---|---|
| 7,660,808 B2 * | 2/2010 | Brechner et al. | 707/999.102 |
| 7,743,022 B2 * | 6/2010 | Kaasten et al. | 707/612 |
| 7,809,384 B2 | 10/2010 | Vargas et al. | |
| 8,195,444 B2 * | 6/2012 | Brunet et al. | 703/24 |
| 2004/0172423 A1 | 9/2004 | Kaasten et al. | |
| 2005/0193188 A1 * | 9/2005 | Huang | 713/1 |
| 2009/0077097 A1 | 3/2009 | Lacapra et al. | |
| 2009/0172384 A1 * | 7/2009 | Anson | 713/2 |
| 2010/0138653 A1 * | 6/2010 | Spencer et al. | 713/167 |
| 2011/0010470 A1 * | 1/2011 | Hulbert et al. | 710/13 |
| 2011/0231420 A1 | 9/2011 | Chen et al. | |
| 2011/0231424 A1 | 9/2011 | Avdanina | |

OTHER PUBLICATIONS

"GoodSync," http://www.goodsync.com/how-it-works/file-synchronization, copyright © 2010.
"Memeo AutoSync," http://www.memeo.com/autosync.php, copyright © 2004-2010.
"Eltima Software," http://mac.eltima.com/sync-mac.html, copyright © 2000-2010.
"Always Sync," http://allwaysync.com/features.html, copyright © 2004-2009.
"iPod touch User Guide for iOS 4 Software," http://manuals.info.apple.com/en_US/iPod_toush_iOS4_User_Guide.pdf, copyright © 2010, Chapter 4, pp. 44-46, "Syncing and File Sharing".
File history for U.S. Appl. No. 12/728,146.

* cited by examiner

*Primary Examiner* — Yuk Ting Choi
(74) *Attorney, Agent, or Firm* — Hollingsworth Davis, LLC

(57) ABSTRACT

A method and system for automatically detecting a coupling of a storage device to one or more computing systems. The method automatically identifies a configuration specific to the computing system and accesses the configuration specific to the computing system. The method automatically identifies a plurality of files residing on the computing system corresponding to the configuration and automatically aggregates the plurality of files to the storage device.

20 Claims, 15 Drawing Sheets

900

METHOD AND SYSTEM FOR AUTOMATICALLY INITIATING A FILE AGGREGATION PROCESS BETWEEN COMMUNICATIVELY COUPLED DEVICES

RELATED APPLICATIONS

This application is related to co-pending U.S. Publication No. 2011/0231424 and is hereby incorporated herein by reference.

BACKGROUND

Certain storage devices lack the ability to automatically transfer computer files from a computing system and require user manipulation to both initiate the process and select the particular files, folders or even entire drives to copy onto the device. Some modern portable media players offer the ability to automatically transfer computer files from a computing system to the portable media player. However, this ability is limited to certain specific folders within the computing system and may be incompatible with accumulating files from multiple systems.

When the number of files becomes significant and/or distributed in various folders and/or drives, the level of user effort required to select and transfer all of the desired files also increases commensurately. This can be an extremely inefficient and effort-intensive process for the user. The problem is further exacerbated when the storage device is shared by more than one computing system. Furthermore, for typical storage devices, the file transfer process must be initiated and, on occasion, monitored and verified by the user (e.g., for identified duplicate files). For large amounts of data, the process may be lengthy, and thus require user attention for long periods of time.

SUMMARY OF THE INVENTION

Embodiments of the present invention are directed to provide a method and system for automatically detecting a coupling of a storage device to one or more computing systems. The method automatically identifies a configuration specific to the computing system and accesses the configuration specific to the computing system. The method automatically identifies a plurality of files residing on the computing system corresponding to the configuration and automatically aggregates the plurality of files to the storage device.

In other embodiments, an electronic system comprises a processor coupled to a memory, the memory having computer readable code, which, when executed by the processor causes the system to implement a method of aggregating electronic files to a storage device. The method automatically identifies a configuration specific to the computing system and accesses the configuration specific to the computing system. The method automatically identifies a plurality of files residing on the computing system corresponding to the configuration and automatically aggregates the plurality of files to the storage device.

In other embodiments, an electronic system comprises a first computing system with a plurality of files and a storage device operable to be coupled to the first computing system. A configuration file specific to the first computing system comprises a plurality of file types, and responsive to a coupling of the storage device to the computing system, the computing system is operable to access the configuration file and, based thereon, is operable to automatically identify a subset of the plurality of files that match the plurality of file types and is further operable to aggregate the subset of the plurality of files to the storage device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
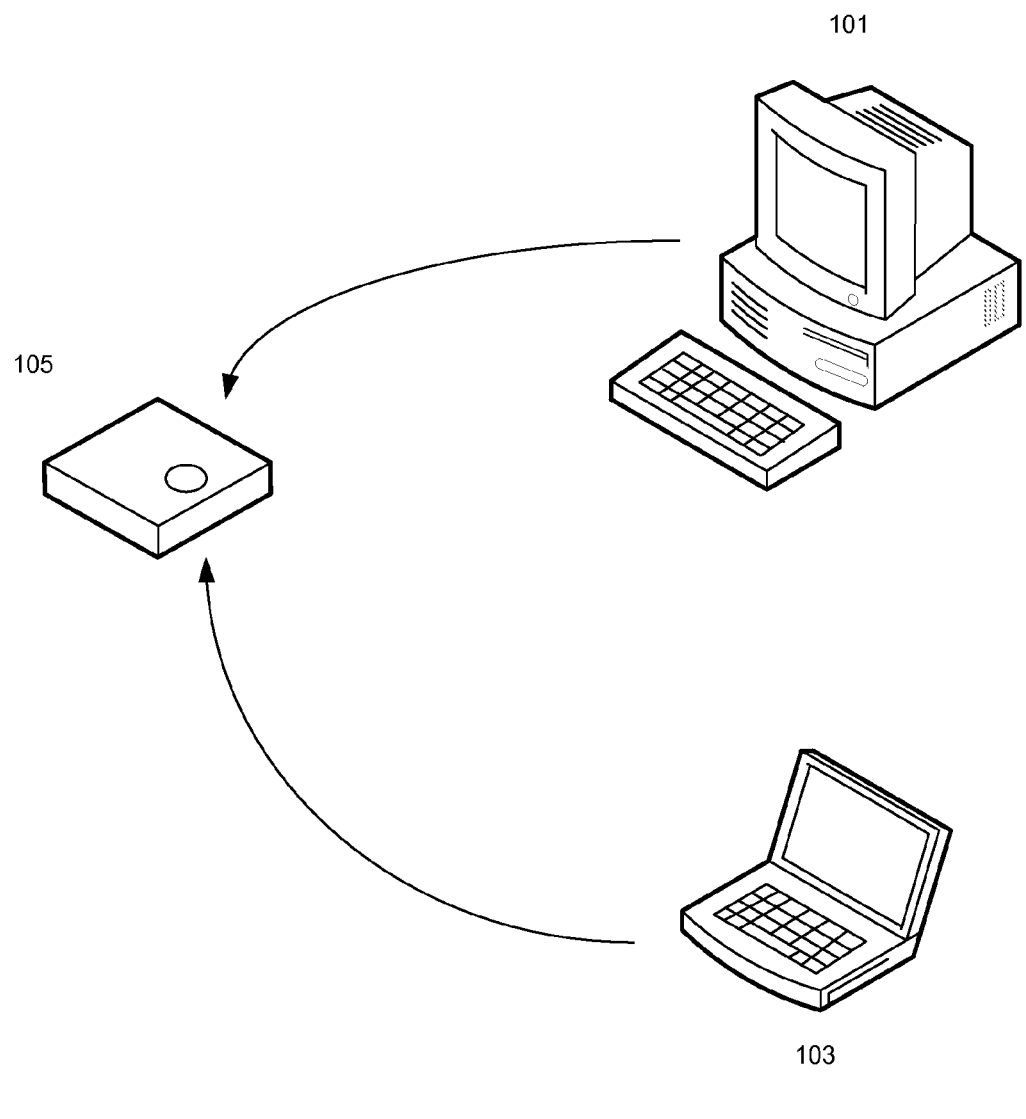
FIG. 1 depicts a data flow diagram of an exemplary system of electronic file aggregation, in accordance with embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIGS. 11, 12, 13, and 15) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

File Aggregation System

According to embodiments of the present invention, a system for aggregating electronic files is provided. In one embodiment, one or more computing systems and one or more storage devices (e.g., hard drives, solid state drives, flash drives, etc.) configured to aggregate electronic files from the computing system(s) are provided. FIG. 1 depicts a data flow diagram of an exemplary system 100 of electronic file aggregation, in accordance with embodiments of the present invention. As depicted, system 100 includes a storage device 105 and a plurality of computer systems (e.g., desktop 101 and laptop 103). Alternate configurations including more or less computer systems and additional storage devices may also be viable. In some embodiments, the storage device may be an external storage device.

In a typical embodiment, a storage device 105 may be physically coupled to a computing device (e.g., desktop 101), e.g., via a data transfer cable such as a universal serial bus ("USB") cable, firewire, eSATA, SATA, etc. Once coupled, the storage device 105 may be configured to automatically initiate a process of aggregating pre-specified files from the desktop 101. Alternatively, the process of aggregating files may also be manually initiated by the user, from a graphical user interface displayed by the desktop 101, for example. In further embodiments, a user can specify the files to be aggregated (e.g., according to the path and/or specific file attributes) prior to an automatically initiated process of aggregation, or, alternatively, on an ad hoc basis during a manually initiated process of aggregation.

Subsequently, the storage device may be de-coupled from the desktop 101 and coupled to an alternate computing device 103 (e.g., laptop, mobile device, etc.). Once coupled, the storage device 105 may likewise automatically initiate a process of aggregating pre-specified files from the alternate computing device 103 or receive user input from the alternate computing device 103 effectively resulting in the manual initiation of the file aggregation process and/or a configuration of the path and specific file attributes for the files to be aggregated.

In alternate embodiments, the storage device may be communicatively coupled to a computing device (e.g., wirelessly over a local network) without a direct physical connection to the computing device. In these embodiments, the process of aggregating pre-specified files may be performed automatically whenever a communicative connection is detected between the computing device and the storage device or according to a pre-set schedule, for example, or, alternatively, may be restricted to a manual initiation of the aggregation process.

While a desktop and other computing devices have been specifically denoted, it is to be understood that the present invention is well suited for use with alternate computing systems including, but not limited to, servers, notebooks, electronic readers, other personal computers, smart phones, personal data assistants, video game consoles, and portable media players.

Exemplary Aggregation Interface

Figure 2:
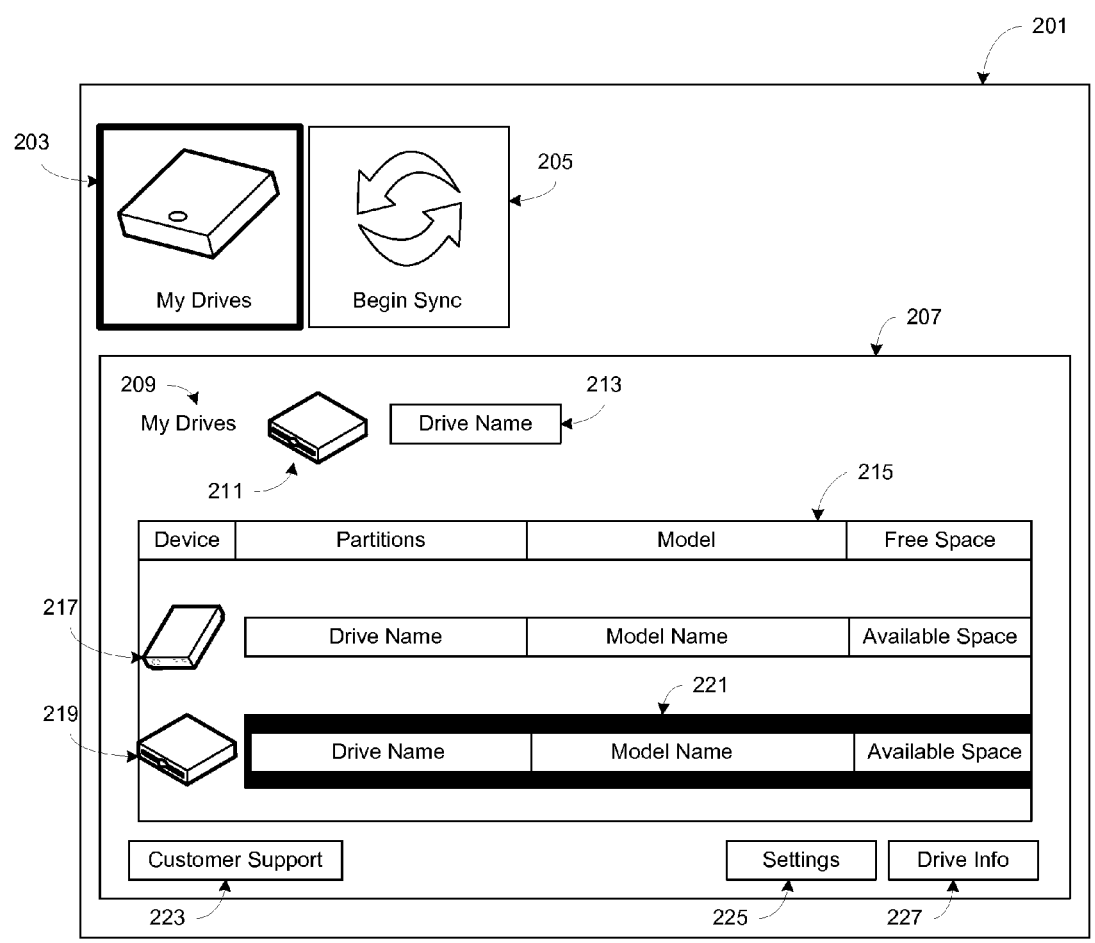
FIG. 2 depicts an on-screen graphical user interface of an exemplary drive selection interface in a system of electronic file aggregation, in accordance with embodiments of the present invention.

According to some embodiments of the present invention, the aggregation of electronic files between one or more file storage devices and one or more computer systems may be performed automatically or manually initiated via user input in an interface. In one embodiment, both automatic aggregation and manual initiation may be configured via a graphical user interface displayed in a display device (e.g., a monitor)

coupled to and/or a part of a computer system coupled to the storage device. With reference now to FIG. 2, a graphical user interface of an exemplary drive-selection interface 200 in a system of electronic file aggregation is depicted, in accordance with embodiments of the present invention.

In typical embodiments, interface 200 may be presented to a user as a graphical user interface, such as configuration window 201, generated by a local computer system and displayed in a display device coupled to the local computer system. In further embodiments, the graphical user interface is generated by software executing on the computer system and representing an instance of an installed application. In still further embodiments, the source code for the software is stored in the storage device, and accessible by a communicatively coupled computer system (e.g., for the purposes of installation).

As depicted, configuration window 201 includes one or more components functionally related to the aggregation of electronic files from a computer system to a coupled storage device. According to some embodiments, these components may be presented as separate and distinct objects within the interface configured to detect and receive user actuation to perform a corresponding function. As presented, window 201 includes: a mechanism for viewing presently coupled storage devices (e.g., "My Drives" button 203); and a mechanism to configure the aggregation of electronic files (e.g., "Begin Sync" button 205).

In one embodiment, actuating on My Drives button 203 presents a display to view and select storage devices coupled to the local computing system. Likewise, a user can configure the aggregation of electronic files by actuating on Begin Sync button 205. In one embodiment, user actuation may be acknowledged and confirmed via visual indicia. The visual indicia may be implemented as, for example, a change in the color, outline, or gradient of the actuated button. As depicted in FIG. 2, user actuation is represented via a visible outline of the actuated button, wherein the My Drives button 203 has registered a user actuation.

In one embodiment, a user actuation on My Drives button 203 generates a sub-interface (e.g., sub-interface 207) to present storage devices presently communicatively coupled (either wirelessly or physically) to the local computer system generating the interface 200, and functionality which may be performed with respect to the storage devices presented. As depicted, sub-interface 207 includes a drive selection sub-window 215, a display of information (e.g., interface name display 209, drive display 211 and drive name display 213). In further embodiments, sub-interface 207 may include other components for effecting certain, identified functionality. For example, as presented, sub-interface 207 also includes: a mechanism for accessing and/or viewing contact information for customer support (e.g., customer support button 223), a mechanism for configuring a selected storage device (e.g., settings button 225), and a mechanism for viewing information corresponding to a selected storage device (e.g., drive info button 227).

Interface name display 209, drive display 211 and drive name display 213, collectively, displays the name of the current interface and, identifies the storage device currently specified to be the target of any user-elected functionality. In one embodiment, the name of the current interface may correspond to the actuated button between My Drives button 203 and Begin Sync button 205, as described above. When neither button is actuated, interface name display 209 may be left blank. As presented, interface name display 209 corresponds to the actuation of My Drives button 203.

In one embodiment, the storage device may be identified by the combination of drive display 211 and drive name display 213. In one embodiment, drive display 211 displays an iconic representation of a currently selected drive. The iconic representation may, for example, correspond to the graphical representation displayed in window 215 for a communicatively coupled storage device (as described below). Similarly, drive name display 213 presents the name of the currently selected storage device or drive (e.g., the name of the storage device) graphically represented in drive display 211. When no storage device is actuated in window 215, or, alternatively, if no storage device is detected as presently communicatively coupled to the local computing system, drive display 211 and drive name display 213 may be left blank. Alternatively, if no storage device is actuated in window 215 but one or more storage devices are detected as presently communicatively coupled to the local computing system, a default storage device may be selected and identified in drive display 211 and drive name display 213.

In one embodiment, drive selection sub-window 215 displays the external storage devices presently communicatively coupled to the local computing system. As presented, sub-window 215 is arranged to display icons of the displayed external storage devices, the presence of existing partitions in each external storage device, the model names of the displayed external storage devices, and the free (unoccupied) space in each displayed external storage device. As shown, the information is displayed in a consistent horizontal field, though alternate arrangements may be used. This information may be referenced by, for example, accessing a knowledge bank (e.g., a data file) containing the data. In some embodiments, the data itself may be directly obtained from parsing driver information stored in the computing system. In alternate embodiments, the data may be acquired by requesting information from the software drivers or other client interfaces that facilitate communication and interaction between the external storage device and the local computing system.

As depicted, storage devices 217 and 219 are depicted in drive selection sub-window 215, and represent storage devices communicatively coupled to the local computing system. The user of the interface 200 is able to select an storage device displayed in sub-window 215 through the interface 200 to configure. User selection may be detected by the computing system from a user actuation on an icon or fields of the sub-window 215 respective of the particular storage device. Once a user actuation has been detected, the selected storage device may be visibly distinguished from unselected storage devices. For example, the icon and information fields corresponding to a selected storage device may be distinguished by representing a visible change in color of the actuated icon and/or fields, a visible outline of the actuated icon and/or fields and/or a visible gradient or displacement from an original position of the icon and/or fields. As depicted in FIG. 2, storage device 219 is visibly distinguished as an actuated drive via outline 221.

In one embodiment, detection of a user actuation on customer support button 223 modifies the window 201 or, alternatively, generates a new and/or separate interface presenting information for contacting the customer support services of the software manufacturer. This information may include, for example, an address, an email address, one or more telephone numbers, etc. In further embodiments, a message submission form implemented as a user input terminal may be included, wherein user input effecting a written message may be directly submitted through the interface. In some embodiments, the message may be submitted if a connection to the Internet is detected. In further embodiments, if a connection to the Internet is not detected, the message may be stored and automatically submitted when a connection is determined.

According to some embodiments, detection of user actuations on settings button 225 and/or drive info button 227 likewise produces an alternate display in window 201 and/or generates a new and/or separate interface corresponding to configuring settings for an storage device selected in window 215 and presenting detailed information for the same storage device selected in window 215, respectively. For example, an actuation on settings button 225 may produce a separate display or generate a new window corresponding to configuring certain settings for the storage device. These settings may include (but are not limited to), for example: power settings (e.g., the conditions under which the storage device may enter a power-saving mode of operation), testing the storage device's connection with a local computing device; checking for software or firmware updates for the device; and registering the device with the manufacturer of the device. In further embodiments, one or more of these settings may be configured via a separate produced display or generated window.

Figure 3:
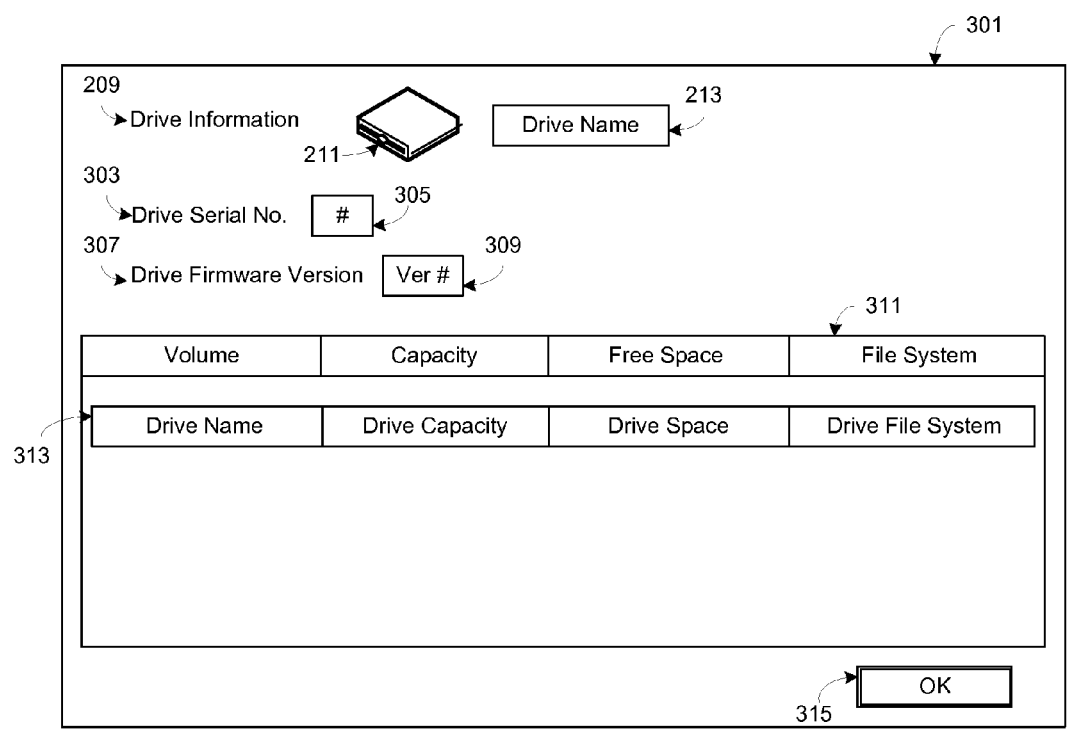
FIG. 3 depicts an on-screen graphical user interface of an exemplary drive information interface in a system of electronic file aggregation, in accordance with embodiments of the present invention.

With reference now to FIG. 3, a graphical user interface of an exemplary drive information interface 300 in a system of electronic file aggregation is depicted, in accordance with embodiments of the present invention. In typical embodiments, drive information interface 300 may be presented to a user as a graphical user interface, such as drive information window 301, generated by a an executing software application in response to user input. In one embodiment, drive information interface 300 is produced by a user actuation on drive info button 227, as described above with reference to FIG. 2. According to some embodiments, user actuation on drive info button 227 generates a new window—drive information window 301. According to alternate embodiments, user actuation on drive info button 227 replaces the display in sub-interface 207 with the drive information window 301.

In one embodiment's configuration, drive information window 301 includes interface name display 209, drive display 211 and drive name display 213 as described above. In addition, drive information window 301 will also include, in typical embodiments, a display of information corresponding to the storage device identified in displays 211, and 213. This display of information may be presented in a combination of, for example, drive serial number display 303, drive firmware version display 307, drive information sub-window 311, and drive entry 313. In one embodiment, drive serial number display 303 displays the individual serial number of the storage device (e.g., in serial number text field 305). The firmware version currently operating on the storage device may be displayed in drive firmware version display 307 (e.g., in firmware version field 309).

Drive information sub-window 311 may display a pre-arranged graphic of detailed information of the selected storage device (e.g., the storage device identified in drive display 211 and drive name display 213). As depicted, sub-window 311 may be presented as a chart and may display headings for information regarding the specific volume (e.g., a partition), the total capacity of the volume, the current available space in the volume, and the file system of the volume (e.g., FAT32, NTFS). As presented, sub-window 311 displays information corresponding to the external storage device in a horizontal field (e.g., field 313). In one embodiment, data in field 313 is arranged to correspond with the headings of sub-window 311.

Figure 4:
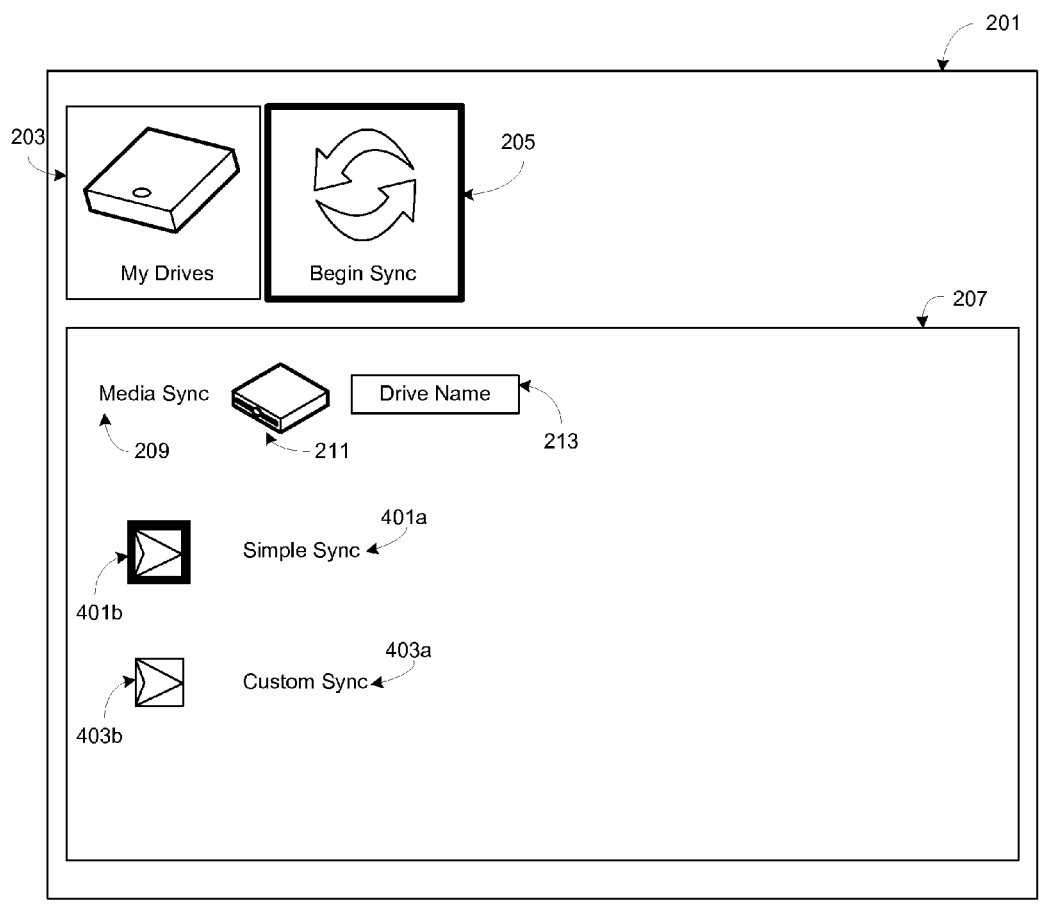
FIG. 4 depicts an on-screen graphical user interface of an exemplary aggregation mode selection interface in a system of electronic file aggregation, in accordance with embodiments of the present invention.

Once a storage device has been selected in window 215, the aggregation of files to the storage device may be configured through the window 201 via a user actuation on the Begin Sync button 205. In some embodiments, when a user actuation of the Begin Sync button 205 is detected, the content displayed in the window 201 may be modified to display functionality corresponding to configuring and performing an aggregation of files from the local computing device to the communicatively coupled storage device. In some embodiments, the storage device is an external storage device. FIG. 4 depicts a graphical user interface of an exemplary aggregation selection interface 400 in a system of electronic file aggregation, in accordance with embodiments of the present invention. In one embodiment, the interface 400 is the interface displayed once a user actuation of the Begin Sync button 205 is detected.

In a typical configuration, interface 400 includes the window 201, the mechanism for viewing presently coupled external storage devices (My Drives button 203); the mechanism to configure the aggregation of electronic files (Begin Sync button 205), and the sub-interface 207 described above with reference to FIG. 2. In one embodiment, interface 400 may replace the content displayed in sub-interface 207 with additional content relevant to the aggregation of files from the local computing device to a storage device.

In one embodiment, interface 400 includes in a display (e.g., within the sub-interface 207) the drive display 211 and the drive name display 213 also described above. In further embodiments, sub-interface 207 of interface 400 also includes components (collectively, simple sync component 401a, 401b and custom sync component 403a, 403b) to receive a user actuation corresponding to the selection of a particular format of aggregating files from the local computing device to a storage device. As depicted, the simple sync component includes a name display 401a and a button 401b configured to detect a user actuation. Likewise, the custom sync component includes a similar name display 403a corresponding to a button 403b.

In one embodiment, simple sync component and custom sync component each represent distinct configurations (e.g., "simple sync" and "custom sync," respectively) for aggregating files. In one embodiment, the simple sync configuration comprises a configuration wherein the files in a pre-set or default path and according to a pre-set file type may be aggregated without further user input or modification. The pre-set path may, for example, comprise a previous user configuration of a desired drive, folder or file to be aggregated. Likewise, the pre-set file type may comprise previously user-selected file types (e.g., file extensions). In further embodiments, a simple sync configuration may also comprise automated aggregation, such that the aggregation according to the pre-set path(s) and pre-set file type(s) may be commenced whenever the storage device is coupled to the local computing system.

Alternatively, the pre-set path and file types may comprise manufacturer pre-set default configurations. The manufacturer pre-set default settings may comprise a path to a popular and/or personal folder in the file system (e.g., "My Documents" folder in some operating systems). Likewise, the manufacturer pre-set default settings may comprise a default selection of one or more file types. For example, media files (e.g., file types corresponding to image, video, audio) may comprise a default setting. Likewise, documents or other business files (e.g., electronic literature, documents, presentations, spreadsheet, and database files) may also comprise a default setting. Users may select between the two configurations via an actuation of the button, e.g., button 401b and 403b, corresponding to the preferred selection.

User actuation detected on button 401b thus effects a selection of the simple sync configuration. Likewise, user actuation detected on button 403b effects a selection of the custom sync configuration. In some embodiments, a detected user actuation may be confirmed and represented in the interface 400 and the sub-interface 207 via visible indicia. As provided previously, visible indicia may serve to distinguish the actuated component from the un-actuated component. Visible indicia may, as described, comprise a variety of embodiments, alone or in combination, such as color, outline, and gradients in perceived depth, among others.

In one embodiment, actuation of the simple sync button 401b configures the aggregation automatically according to pre-set or default settings, as described above. In further embodiments, the aggregation may commence immediately upon a detected actuation of simple sync button 401b. Alternatively, actuation of the custom sync button 403b may produce an alternate display in the sub-interface 207, or generate a separate interface that displays additional settings to allow a user to specifically configure aggregation. A user may subsequently alter the selection by returning to the interface 400 and actuating the alternate button.

Figure 5:
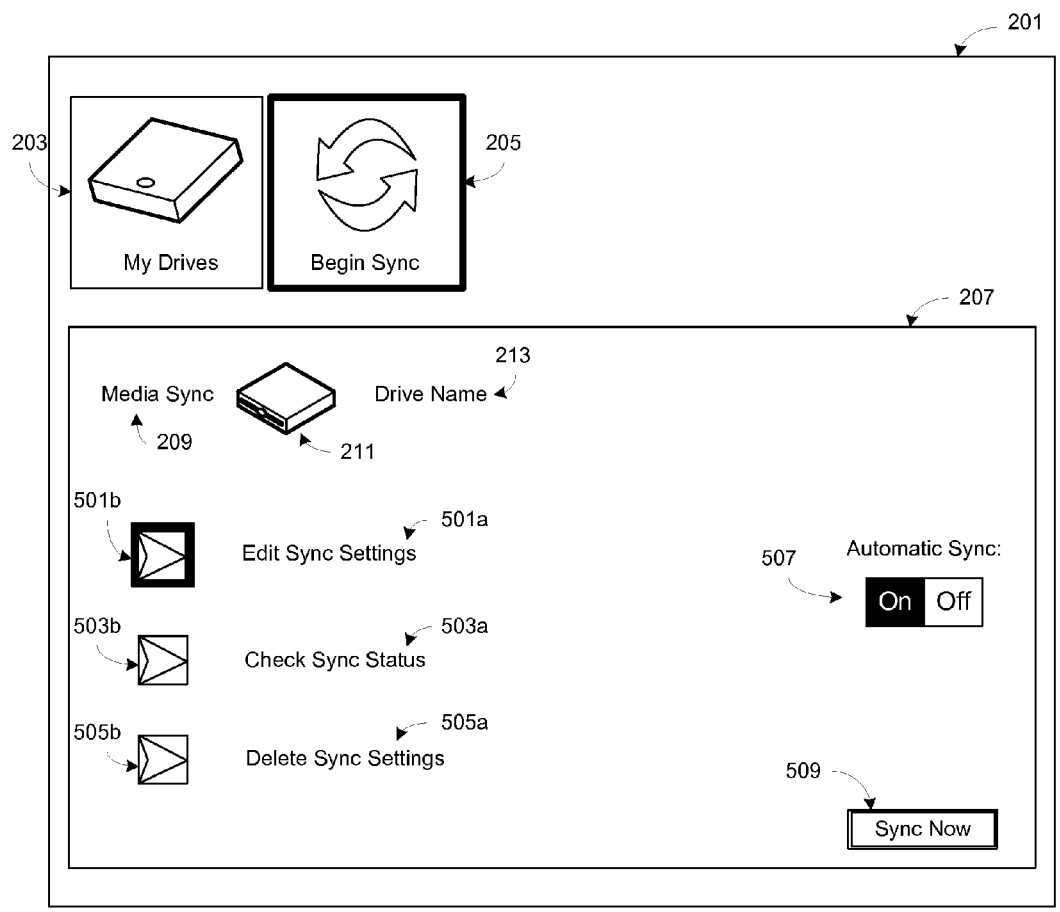
FIG. 5 depicts an on-screen graphical user interface of an exemplary configuration interface in a system of electronic file aggregation, in accordance with embodiments of the present invention.

With reference now to FIG. 5, a graphical user interface of an exemplary configuration interface 500 in a system of electronic file aggregation is depicted, in accordance with embodiments of the present invention. In one embodiment, the interface 500 is the display generated when the custom sync button 405b is actuated. In one embodiment's configuration, interface 500 includes the window 201, the mechanism for viewing presently coupled storage devices (My Drives button 203); the mechanism to configure the aggregation of electronic files (Begin Sync button 205), and the sub-interface 207 described above with reference to FIG. 2. In one embodiment, interface 500 may modify or replace the content displayed in sub-interface 207 with additional content relevant to configuring the aggregation of files from the local computing device to a storage device.

In one embodiment, interface 500 includes in a display (e.g., within the sub-interface 207) the drive display 211 and the drive name display 213 also described above. As depicted, interface 500 also includes a component for initiating aggregation configuration (collectively, 501a, 501b), a component for viewing the aggregation status of a storage device (collectively, 503a, 503b), a component for deleting pre-set aggregation settings (collectively, 505a, 505b), a display for indicating automated aggregation 507 and a component to commence immediate aggregation (e.g., sync now button 509).

In one embodiment, the component for initiating aggregation configuration, the component for viewing the aggregation status of an external storage device, and the component for deleting pre-set aggregation settings each comprises an identification display (identification displays 501a, 503a, 505a, respectively) and a button (e.g., aggregation settings button 501b, status button 503b, delete settings button 505b). The identification display identifies the option or component. For example, "Edit Sync Settings" corresponds to editing aggregation settings for an external storage device; "Check Sync Status" corresponds to viewing the status of aggregation for a storage device; and "Delete Sync Settings" corresponds to deleting aggregation settings for a storage device. Thus, a user may select from among these components to set, view, or delete the configuration of custom aggregation.

The buttons 501b, 503b, 505b are configured to detect user actuation. Once an actuation on a button is detected (i.e. through a mouse click, screen touch, keyboard input, or other actuation methods), the actuation may be acknowledged and confirmed to the user via visible indicia (similar to visible indicia described above). As depicted, aggregation settings button 501b has been selected and includes visible indicia (stark outline). Actuating the button corresponding to "Edit Sync Settings" (e.g., button 501b) may produce a new display or generate a new window with additional configurable options. Likewise, actuating the button corresponding to "Check Sync Status" (e.g., button 503b) may produce a new display or generate a new window which displays the status of file aggregation for the selected storage device coupled to the local computing system (e.g., the storage device represented in drive display 211 and drive name display 213). In some embodiments, actuating on the button corresponding to "Delete Sync Settings" (e.g., button 505b) will delete the current saved settings for the selected storage device.

In some embodiments, the settings for aggregation between a storage device and each computing system previously communicatively coupled to the storage device may be saved within the storage device itself (e.g., as a data file). Thus, user actuation on the button 505b corresponding to "Delete Sync Settings" may, in one embodiment, delete the data file comprising the stored configuration between the storage device and the local computing device. In further embodiments, actuating on the button 505b may generate one or more validation windows to verify the user selection of setting deletion.

In one embodiment, the display for indicating automated aggregation comprises a display (e.g., display 507) indicating the current configuration for automated aggregation. As depicted, the display 507 comprises an indication implemented as either "On" or "Off." The current prevailing configuration may, in some embodiments, be visibly distinguished from the inactive configuration. As presented, the "On" configuration is represented as being the active configuration. In one embodiment, if the "On" portion of the display is active, automated aggregation is active. Subsequently, aggregation according to previously set configuration commences upon the detection, by the local computing system, of a communicative coupling with the selected storage device. Alternatively, if "Off" is displayed, automatic aggregation is inactive, and, therefore, aggregation commences only in response to a further actuation of the component to commence immediate aggregation (e.g., the "Sync Now" button 509). Accordingly, aggregation may be commenced via an actuation of the "Sync Now" button 509.

Figure 6:
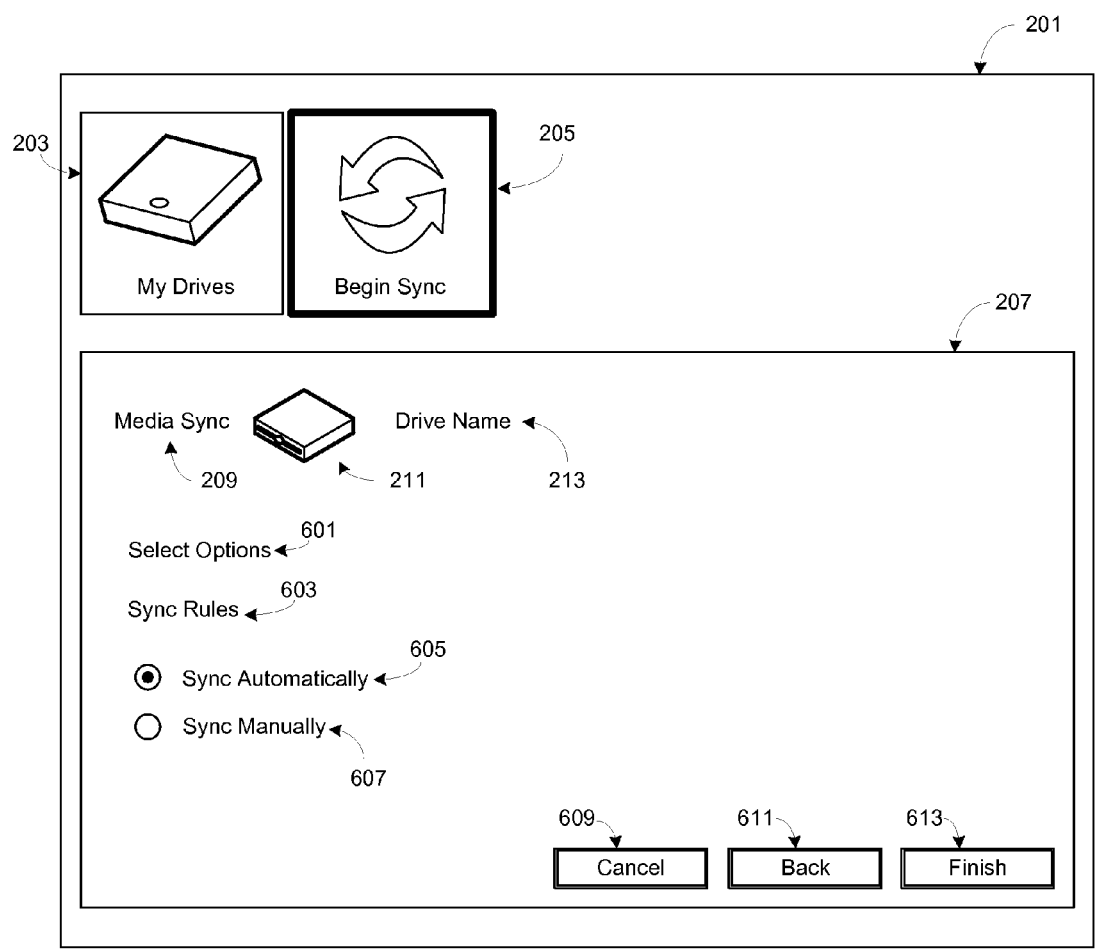
FIG. 6 depicts an on-screen graphical user interface of an exemplary aggregation configuration interface in a system of electronic file aggregation, in accordance with embodiments of the present invention.

FIG. 6 depicts a graphical user interface of an exemplary sync configuration interface 600 in a system of electronic file aggregation, in accordance with embodiments of the present invention. In one embodiment, interface 600 is the new display produced and/or the new window when user actuation of the "Edit Sync Settings" button (e.g., button 501b) is detected. In a typical configuration, interface 600 includes the window 201, the mechanism for viewing presently coupled storage devices (My Drives button 203); the mechanism to configure the aggregation of electronic files (Begin Sync button 205), and the sub-interface 207 described above with reference to FIG. 2. Likewise, sub-interface 207 may include, according to some embodiments, the drive display 211 and the drive name display 213 also described above. In one embodiment, interface 600 may modify or replace the content displayed in sub-interface 207 with additional content relevant to configuring the automation and other settings of file aggregation from the local computing device to an external storage device.

In a typical configuration, interface 600 includes a component for accessing aggregation options (e.g., options button 601), and an automated aggregation toggle (collectively, title 603, automatic button 605 and manual button 607). Options button, when actuated, may alter the display or generate a new window to allow further customization of the current aggregation configuration. Automated aggregation toggle is configured to receive user input corresponding to a selection between automated and manual aggregation. As presented, title 603 (displayed as "Sync Rules") identifies the toggle. Automatic button 605 and manual button 607 collectively operate as a toggle (thus, when one is active the other is not). The buttons 605, 607 are configured to detect user actuation. Thus, a user is able to select between manual and automatic aggregation via an actuation on one of the buttons 605, 607. Once user actuation of a button 605, 607 is detected, the actuated button may be visibly distinguished (in accordance to embodiments discussed above, for example) from the non actuated button. As depicted, the active button (e.g., the button 605 corresponding to "Sync Automatically") appears with a signal.

In some embodiments, interface 600 includes components enabling navigation through the aggregation configuration process. As depicted, these components include cancel button 609, back button 611, and finish button 613, each of which is configured to receive a user actuation. In one embodiment, user actuation on the cancel button 609 cancels the progress and exits the configuration interface. In further embodiments, the user's selections for the present session are not stored, and, on the next generation of the interface in the local computing system, no user input is retained. In alternate embodiments, the user's selections (if any) are retained.

In one embodiment, user actuation of the back button 611 alters the content displayed in sub-interface 207 to the previous display (e.g., from interface 600 to interface 500). In one embodiment, user actuation of the finish button 613 completes the configuration process and commences aggregation automatically (if the aggregation is configured for automatic aggregation). Otherwise, aggregation is commenced if pre-set conditions are met. If no conditions are set, aggregation between the local computing device and the selected, communicatively coupled storage device may not occur until further user configuration.

Figure 7:
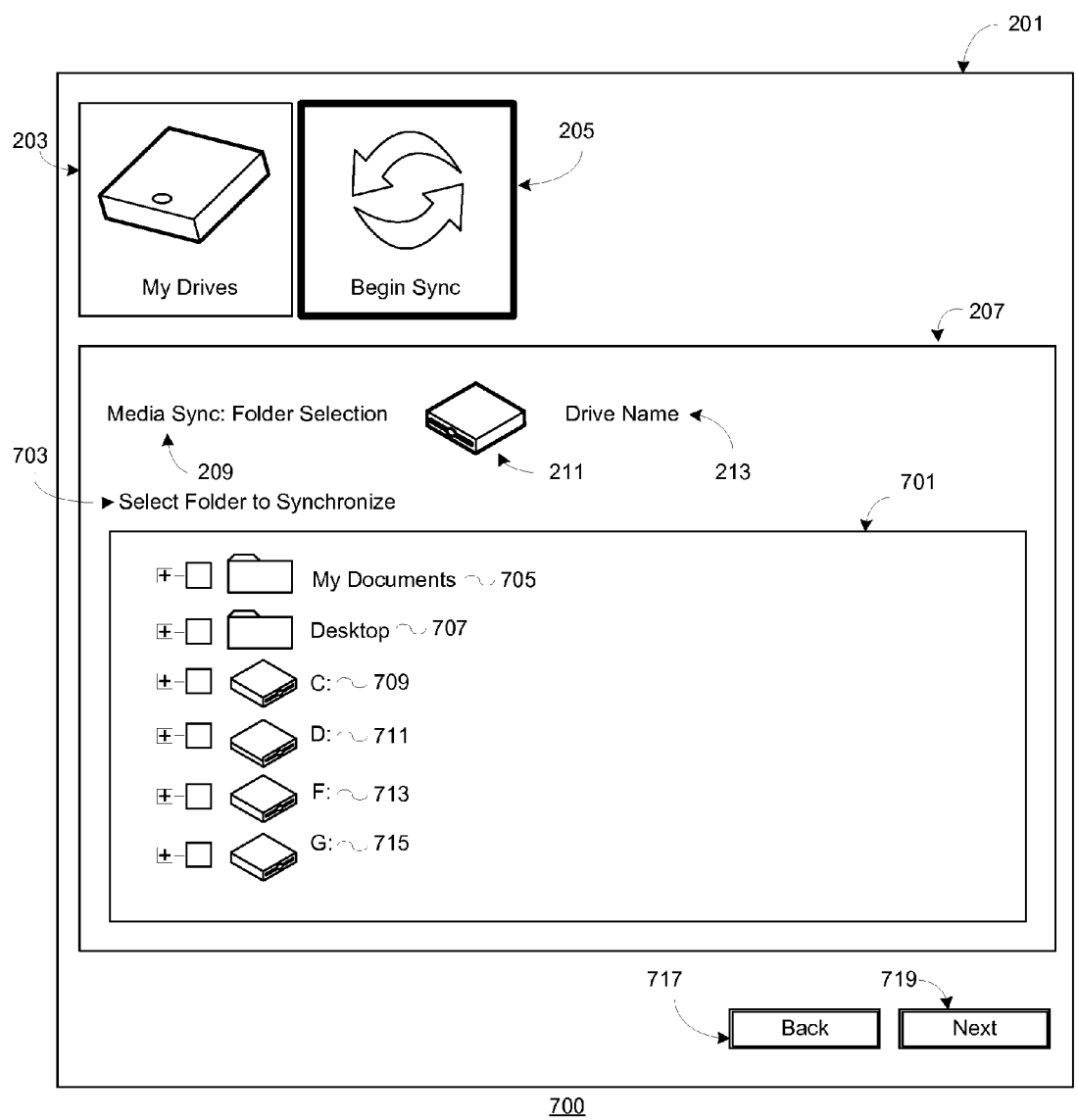
FIG. 7 depicts an on-screen graphical user interface of an exemplary path selection interface in a system of electronic file aggregation, in accordance with embodiments of the present invention.

FIG. 7 depicts a graphical user interface of an exemplary path selection interface 700 in a system of electronic file aggregation, in accordance with embodiments of the present invention. As depicted, interface 700 is the new display produced and/or the new window generated when user actuation of the "Select Options" button (e.g., button 601) is detected. In a typical configuration, interface 700 includes the window 201, the mechanism for viewing presently coupled storage devices (My Drives button 203); the mechanism to configure the aggregation of electronic files (Begin Sync button 205), and the sub-interface 207 described above with reference to FIG. 2. Likewise, sub-interface 207 may include, according to some embodiments, the drive display 211 and the drive name display 213 also described above. In one embodiment, interface 700 may modify or replace the content displayed in sub-interface 207 with additional content relevant to configuring the path(s) in the local computing system from which file aggregation will be performed.

In a typical configuration, interface 700 also includes a sub-window 701, configured to allow the selection of one or more paths in which aggregation may be performed. For example, a user may submit input corresponding to a drive or folder in the local computing device. Aggregation of pre-selected or default file types may thus be performed exclusively in the targeted path. As depicted, sub-window 701 includes title text 703, and a plurality of selectable file storage locations within the file system of the local computing system. Title text 703 identifies or displays brief instructions to elicit a response from the user (e.g., "Select Folder to Synchronize").

The plurality of selectable file storage locations (e.g., folder 705 and 707, drives 709, 711, 713 and 715) each includes a visual representation of the class of storage organization (e.g., folder, drive). As depicted, the plurality of selectable file storage locations includes a box configured to receive a user actuation representing user selection of the particular path. Also depicted is a mechanism for exploding (e.g., expanding) a specific path to access sub-folders within the path, thereby allowing a user to configure the path with greater specificity/particularity.

Also depicted are interface navigation buttons, button 717 (e.g., "Back") and button 719 (e.g., "Next"). Button 717 allows the user to return to the previous interface, (e.g., from interface 700 to interface 600). Thus, user actuation detected on button 717 modifies the content displayed in interface 201 and/or sub-interface 207 to the most recent previous interface. Likewise, button 719 allows the user to proceed to the next display to further configure the aggregation process.

Figure 8:
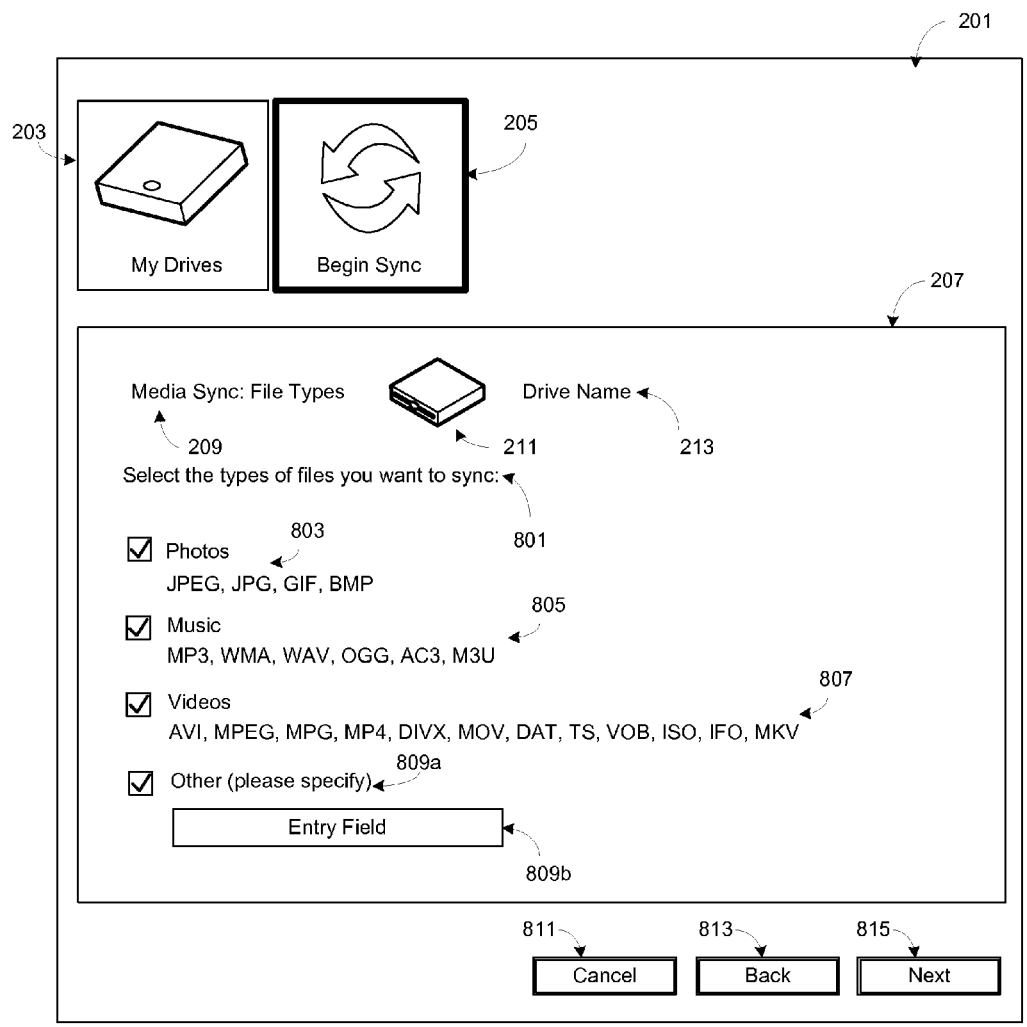
FIG. 8 depicts an on-screen graphical user interface of an exemplary file configuration interface in a system of electronic file aggregation, in accordance with embodiments of the present invention.

FIG. 8 depicts a graphical user interface of an exemplary file configuration interface 800 in a system of electronic file aggregation, in accordance with embodiments of the present invention. Interface 800 enables the configuration, by a user, of the particular file types the user would like to aggregate from the local computing device to the selected storage device. In one embodiment, interface 800 is the interface displayed in response to user actuation of the button 719 ("Next") in the interface 700. In other embodiments, alternate orders of presentation may be provided such that, for example, configuration of the file type(s) may be performed prior to the configuration of the target path(s).

As with several other interfaces herein provided, interface 700 includes the window 201, the mechanism for viewing presently coupled storage devices (My Drives button 203); the mechanism to configure the aggregation of electronic files (Begin Sync button 205), and the sub-interface 207 (possibly including the drive display 211 and the drive name display 213), all of which are described above with reference to FIG. 2. In one embodiment, interface 800 may modify or replace the content displayed in sub-interface 207 from interface 700 with additional content relevant to specifying the file type(s) in the local computing system from which file aggregation will be performed.

In a typical configuration, interface 800 includes instructional text (e.g., text 801), and components for specifying specific file types to include in the aggregation of files from the local computing device to the selected storage device (e.g., file type objects 803, 805, 807 and collectively, 809*a*, 809*b*). The text 801 identifies or displays brief instructions to elicit a response from the user. As depicted, one or more of the file type objects (803, 805, 807) specify a "type" of file (e.g., 803 specifies "Photos", 805 specifies "Music" and 807 specifies "Videos") along with one or more file extensions corresponding to the type. Accordingly, a selection of a type of file will result in an aggregation from the local computing device to the storage device of all the files at the target path having a file extension corresponding to the type. This selection may be performed, for example, via a user actuation of the box portion of the file type object 803, 805, 807, 809*a* and *b*. Thus, in some embodiments, if the "Photos" component was selected, files in the target path having file extensions of .JPEG, .JPG, .GIF, .BMP, etc. will be included during aggregation.

In some embodiments, for file types and/or file extensions not provided among the specified file type objects (803, 805, 807), user input may be received for specifying additional file types in the Specify Other component (collectively, 809*a*, 809*b*). For example, user input corresponding to a file type may be received in the entry field 809b. Text 809a may identify or provide instructions for the entry field 809b. While media files have been depicted in interface 800, it is to be understood that the presentation of media files is to be instructional only, and that embodiments of the present claimed subject matter are well suited to include other file types as herein described or otherwise identified. In some embodiments, however, certain files and/or file types may be ineligible to aggregate. These files may include, for example, system files in the local computing device. During an aggregation process, these files may be exempt from aggregation.

Once the file type(s) and path(s) are selected for aggregation, subsequent aggregations—e.g., aggregations commenced either automatically or manually, will automatically scan the folder or drive at the specified path and all subfolders to identify the files having the selected file type. These files are then aggregated immediately (if manual initiation is active), or once the conditions for automatic aggregation are achieved (e.g., whenever the storage device is communicatively coupled to the local computing device).

Also depicted are interface navigation buttons, button 811 (e.g., "Cancel"), button 813 (e.g., "Back") and button 815 (e.g., "Next"). Button 811, when actuated, may, in some embodiments, exit the interface and/or stop the execution of the configuration application. In further embodiments, the user's selections for the present session are not stored, and, on the next generation of the interface in the local computing system, no user input is retained. In alternate embodiments, the user's selections (if any) are retained. Button 813 allows the user to return to the previous interface, (e.g., from interface 800 to interface 700). Thus, user actuation detected on button 813 modifies the content displayed in interface 201 and/or sub-interface 207 to the most recent previous interface. Likewise, button 815 allows the user to proceed to the next display to further configure the aggregation process.

Figure 9:
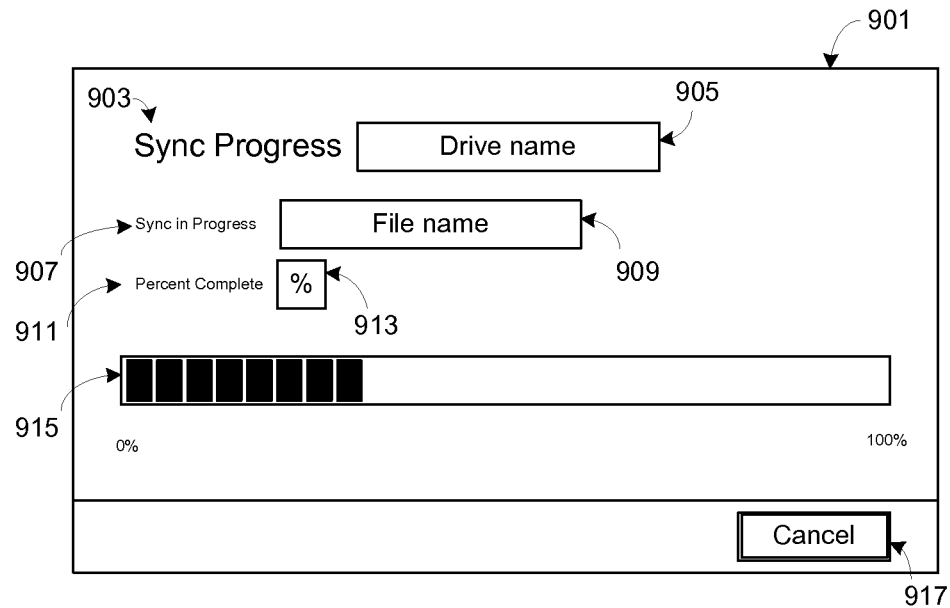
FIG. 9 depicts an on-screen graphical user interface of an exemplary aggregation progress interface in a system of electronic file aggregation, in accordance with embodiments of the present invention.

FIG. 9 depicts a graphical user interface of an exemplary sync progress interface 900 in a system of electronic file aggregation, in accordance with embodiments of the present invention. Interface 900 presents the progress of an initiated aggregation of files from the local computing device to a selected storage device. In one embodiment, interface 900 displays the progress of a manually initiated aggregation. In further embodiments, interface 900 is the interface displayed in response to user actuation of the button 509 ("Sync Now") in the interface 500. In still further embodiments, interface 900 is generated and displayed for at least the entire duration of the aggregation. Once aggregation terminates, due to completion or pre-mature cancellation for example, interface 900 may also be closed immediately, or, alternatively, the user may be prompted with the option to close the window 901.

In one embodiment, interface 900 may be displayed in a separate window 901. In alternate embodiments, window 901 may replace the content displayed in sub-interface 207 of FIG. 5 once a manual aggregation has been initiated from user actuation. As depicted, window 901 includes identification text (e.g., text 903, 907 and 911), data fields (e.g., data fields 905, 909 and 913), progress bar 915, and cancel button 917.

Identification text (e.g., text 903, 907, and 911) is provided to identify the data provided in the corresponding data fields. For example, text 903 (entitled, "Sync Progress") corresponds to data field 905, which displays the name of the storage device. Text 907 (entitled, "Sync in Progress") corresponds to data field 909, which displays the most current file being aggregated. Likewise, text 911 (entitled "Percent Complete") corresponds to data field 913, which displays the estimated progress of the aggregation of the current file, as a percentage. Progress bar 915 is a visible representation of the progress of the entire aggregation process and displays the estimated progress of the entire aggregation process as a bar of one or more discrete units whose area is adjusted relative to the progress of the aggregation process. Cancel button 917 allows a user to cancel the aggregation process via a user actuation.

Figure 10:
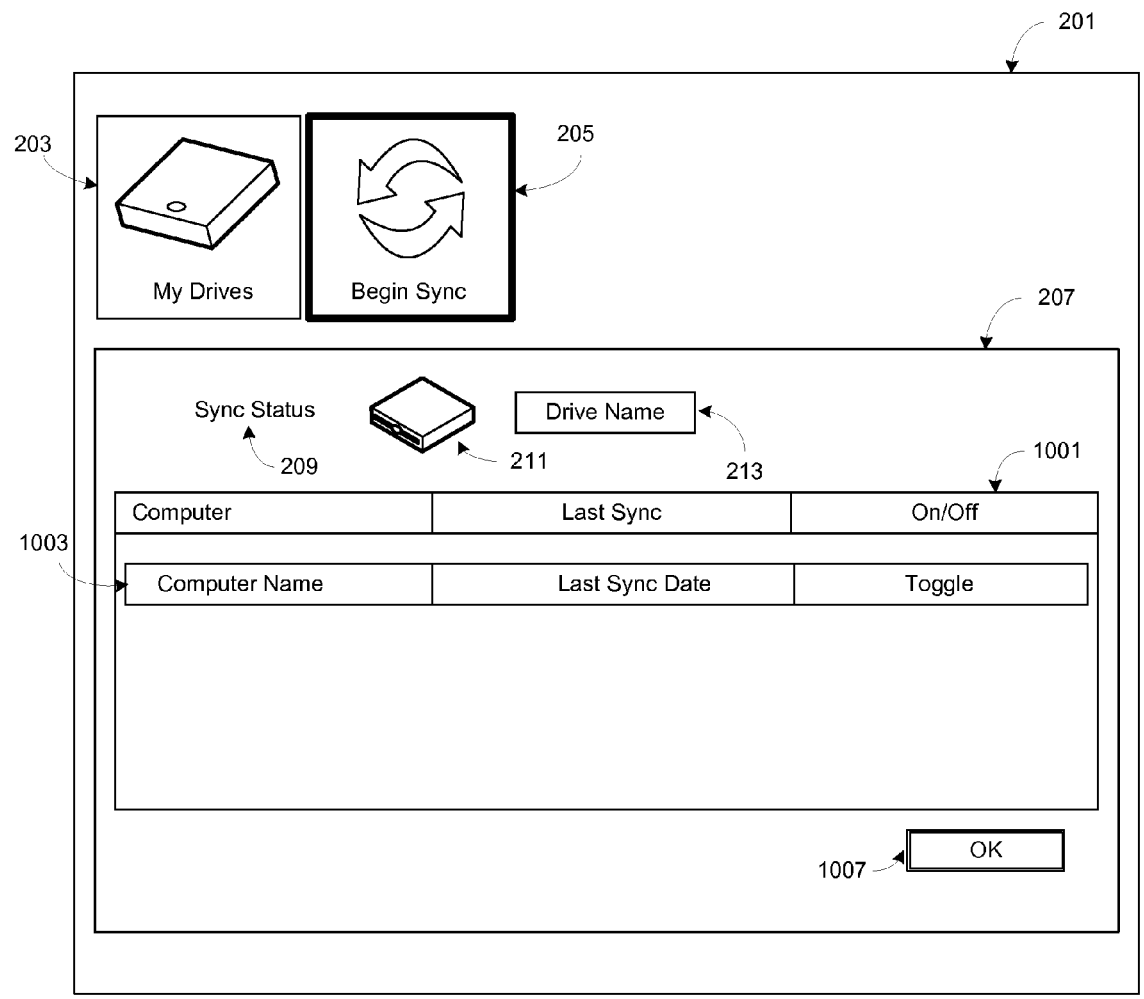
FIG. 10 depicts an on-screen graphical user interface of an exemplary aggregation history interface in a system of electronic file aggregation, in accordance with embodiments of the present invention.

With reference now to FIG. 10, a graphical user interface of an exemplary aggregation history interface 1000 in a system of electronic file aggregation is depicted, in accordance with embodiments of the present invention. Interface 1000 displays the aggregation history of computing devices which have been aggregated to a storage device. In one embodiment, interface 1000 is the interface displayed in response to user actuation of the button 503b ("Check Sync Status") in the interface 500.

In one embodiment interface 1000 includes the window 201, the mechanism for viewing presently coupled external storage devices (My Drives button 203); the mechanism to configure the aggregation of electronic files (Begin Sync button 205), and the sub-interface 207 (including the drive display 211 and the drive name display 213), all of which are described above with reference to FIG. 2. Accordingly, interface 1000 may display the aggregation history of the computing devices with the storage device identified in drive display 211 and drive name display 213. In one embodiment, interface 1000 may modify or replace the content displayed in sub-interface 207 from interface 500 with a display of the aggregation history of the computing devices.

In one configuration, interface 1000 includes a sub-window 1001, which displays, in a pre-formed arrangement, the information regarding the aggregation history of the computing devices which have been aggregated to the storage device. As depicted, the pre-formed arrangement comprises a chart which organizes and identifies information according to columns. In one embodiment, the columns include the name of the computing system, the date and/or time of the last aggregation for the computing system, and whether automatic aggregation is active for the computing system. A computing system entry (e.g., entry 1003) thus includes data fields arranged to correspond to the columns. In some embodiments, interface 1000 includes a terminate button (e.g., "OK" button 1007) which, when actuated, adjusts the content displayed in the sub-interface 207 to the most recent previous interface (e.g., interface 500).

Aggregating Files

Figure 11:
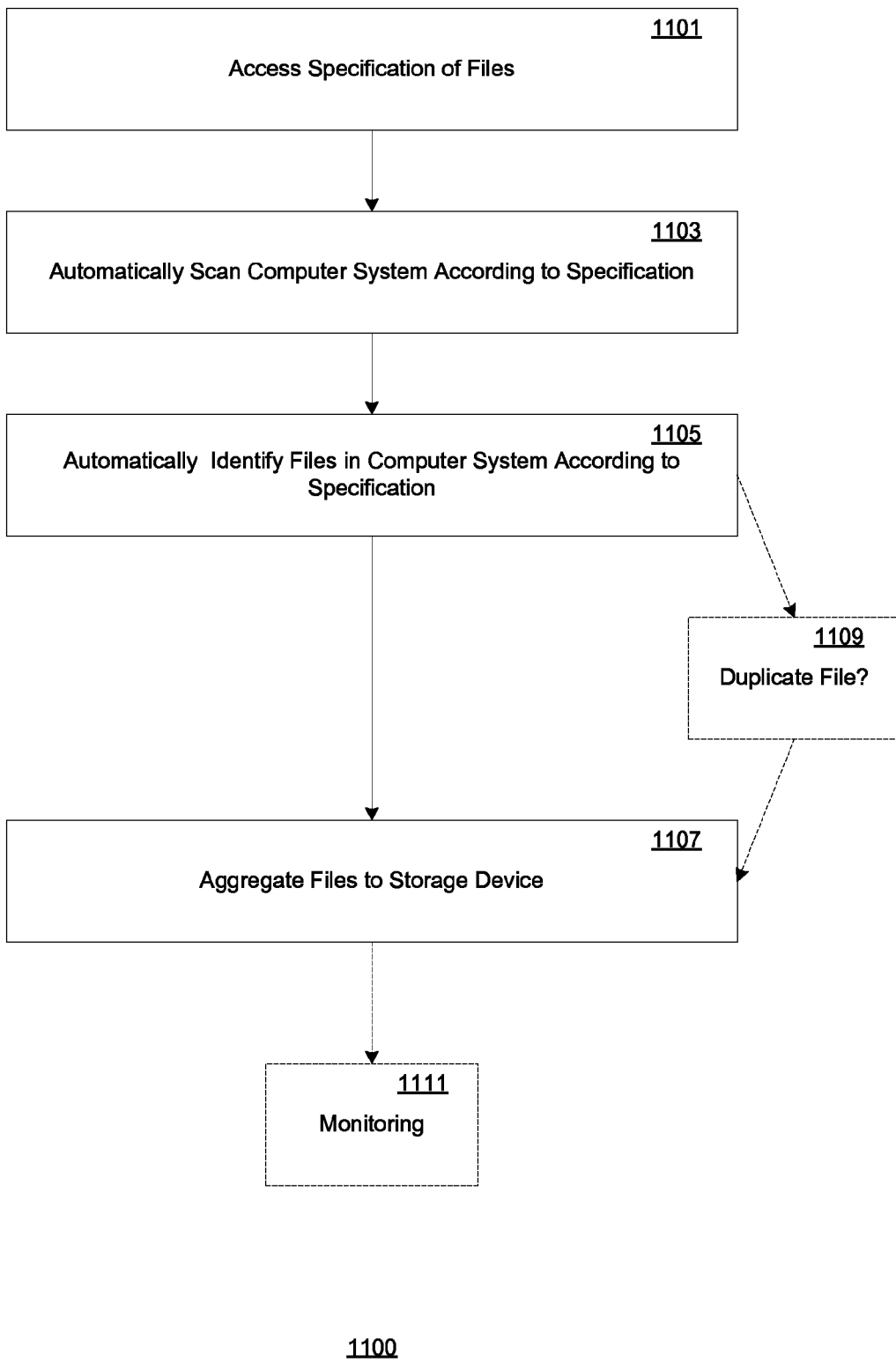
FIG. 11 depicts a flow chart of an exemplary computer-implemented process for automatically aggregating files from a computing system to a storage device, in accordance with embodiments of the present invention.

With reference now to FIG. 11, a flow chart 1100 of an exemplary process for automatically aggregating files from a computing system to an storage device is depicted, in accordance with embodiments of the present invention. Although specific steps are disclosed in the flowcharts 1100 and 1200, such steps are exemplary. That is, embodiments of the present invention are well suited to performing various other (additional) steps or variations of the steps recited in flowcharts 1100 and 1200. It is appreciated that the steps in flowcharts 1100 and 1200 may be performed in an order different than presented, and that not all of the steps in the flowcharts 1100 and 1200 may be performed. Steps 1101-1107 describe exemplary steps comprising the flowchart 1100 in accordance with the various embodiments herein described.

As depicted in FIG. 11, a configuration of files specific to the computing device is accessed at step 1101. The configuration of files may be accessed as a pre-stored configuration file for example. In one embodiment, the pre-stored configuration may be stored locally in the computing system. In alternate embodiments, the pre-stored configuration may be stored in a collection of other configurations (e.g., as a data file comprising a list of configurations) on the storage device.

If however, a pre-stored configuration specific to the computing device is not available, a configuration may be created from user input submitted in an interface or input terminal in an application for configuring an aggregation process between a computing device and a storage device. In one embodiment, the application comprises software executing on the computing device. In one embodiment, the configuration comprises at least a path to a location in a file system of the computing system and one or more file types (e.g., file extensions). The file types comprise the file extensions of the files in the location corresponding to the path that will be aggregated during a file aggregation.

In further embodiments, the pre-stored configuration may also comprise the path(s) and the file type(s) and may be pre-set, by either the user (e.g., as described above under a previously saved custom configuration) or, alternatively, by the manufacturer of the storage device (e.g., a default configuration). In some embodiments, the file types may comprise, for example, one or more file types corresponding to media files (e.g., audio, video or image files). Alternatively, other data files (e.g., office files) may likewise be included in the configuration. In further embodiments, a configuration may be saved specific to the computing device. Thus, subsequent aggregations may be performed according to the configuration saved for the computing device. In still further embodiments, the configuration may be stored in the storage device. Accordingly, the storage device may contain the configurations of multiple computing devices, each configuration comprising the path(s) and file type(s) to aggregate.

Accordingly, in some embodiments, by storing the configuration on an external storage device itself, a single external storage device may be used for multiple computing devices. In such embodiments, aggregation of the files may be performed with the path intact. Thus, the path through the file system of the external storage device may be synchronized with path through the file system of the corresponding computing device for any specific file. In further embodiments, the path may further designate the name of the computer from which the specific file was aggregated. Accordingly, this organization advantageously allows a single external storage device to aggregate files from a multitude of computing devices while retaining file pathname fidelity.

At step 1103, the location in the computing device corresponding to the path (as provided in the configuration) is scanned for files with file extensions which also correspond to the configuration. At step 1105, the files corresponding to the configuration (e.g., the files at the location specified by the path and with the specified file type) are automatically identified. Finally, at step 1107, the identified files are aggregated to the storage device. In one embodiment, the aggregation of the identified files may comprise aggregating previously aggregated files. According to these embodiments, when a file has been identified for aggregation, the storage device is scanned to determine the presence of a duplicate file corresponding to the identified file.

If a duplicate file (a file with the same name as the file identified in step 1105) is detected in optional step 1109, the duplicate file is compared to the file identified in step 1105. In one embodiment, the comparison comprises examining the file attributes of the file identified in step 1105 and the duplicate file and determining the file with the most recent date modified file attribute. If the duplicate file has a more recent date modified file attribute, the file identified in step 1105 is not aggregated, and the entire process 1100 may be repeated for the next identified file. Conversely, if the file identified in step 1105 has a more recent date modified file attribute, the duplicate file in the external storage device may be overwritten at step 1107 with a new duplicate of the file identified in step 1105. In other embodiments, a duplicate file must match additional parameters, such as (but not limited to) file size and/or date created. A file with inconsistent parameters may not be considered a duplicate file for the purposes of aggregation.

For subsequent aggregations, a file which has been previously aggregated to the storage device but which has been removed from the computing device remains on the storage device. In one embodiment, all files aggregated to the storage device remain on the storage device until specifically removed by a user.

In one embodiment, files which have been aggregated to the storage device will maintain an identical path within the storage device. According to these embodiments, path of the file in the computing system will be scanned in the storage device. In some embodiments, if the path within the computing file is not presently created within the storage device, the path is created during (or immediately preceding) the file aggregation, so that the path may be preserved within the storage device for future aggregation.

In still further embodiments, after the initial scan (step 1103) and aggregation (step 1107) is completed, the directories corresponding to the one or more paths designated for scanning in step 1105 are optionally monitored for file modifications at step 1111. Thus, if a new file is detected in the directory, or, alternatively, a modification to an existing file is detected in the directory, the new or modified file may be aggregated to the storage device if the new or modified file type corresponds to the file parameters specified by the configuration specific for the computing system (e.g., a correct file type). This monitoring may be performed continuously (e.g., repeatedly after certain intervals) for as long as the storage device is coupled to the computing device.

In some embodiments, the performance of steps 1103 through 1107 may be variably initiated, e.g., manually initiated or automatically initiated. In further embodiments, performance of steps 1103 through 1107 is automatically initiated when pre-set conditions are met. In still further embodiments, performance of steps 1103 through 1107 commences once a compatible storage device is communicatively coupled to a computing device (with or without the aggregation application installed).

Thus, by comparing the date modified file attribute, aggregation of the most recent file may be performed, so as to advantageously provide a consistent file storage organization during a file aggregation.

Creating a Computing Device-Specific Aggregation Configuration

Figure 12:
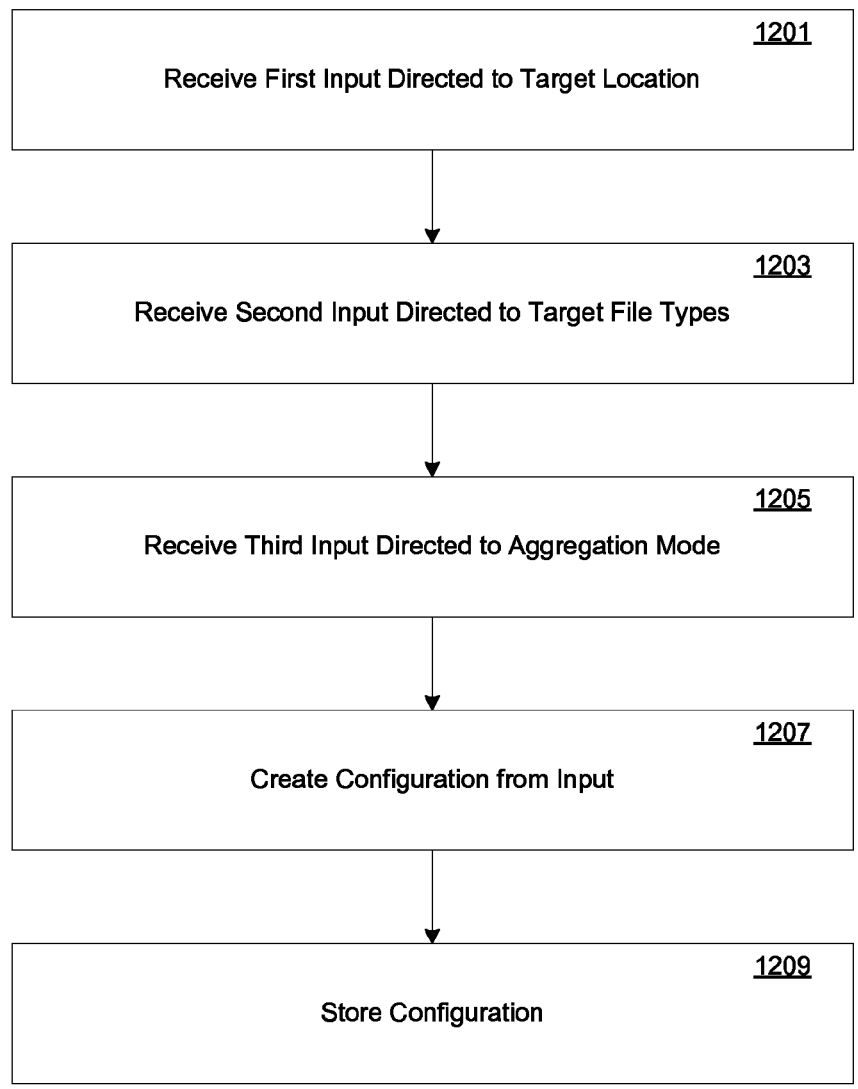
FIG. 12 depicts a flow chart of an exemplary computer-implemented process for creating a customized aggregation configuration for a particular computing system, in accordance with embodiments of the present invention.

With reference now to FIG. 12, a flow chart 1200 of an exemplary process for automatically aggregating files from a computing system to an storage device is depicted, in accordance with embodiments of the present invention. Steps 1201-1209 describe exemplary steps comprising the flowchart 1200 in accordance with the various embodiments herein described. In one embodiment, steps 1201-1209 may comprise the steps performed in step 1101 of FIG. 11 described above.

As depicted in FIG. 12, if no pre-existing configuration of file aggregation exists for a particular computing system (or a user elects to reconfigure an existing configuration), a new configuration specific to the computing system for use during an aggregation process to the storage device may be created. In one embodiment, the configuration may be created via user input received in an on-screen graphical user interface displayed in the display of the computing system. As depicted, a first input is received at step 1201, directed to a location in the computing device. The input may comprise, for example, a pathname indicating a drive or a folder in the computing device.

At step 1203, a second input is received (e.g., in a user input terminal of an on-screen graphical user interface), directed to a selection of file types. The selection of file types may comprise, for example, media files (e.g., audio, video or image files). At step 1205, a third input directed to the mode of aggregation is received. The mode of aggregation may comprise, for example, electing between either a manual mode of aggregation, whereby aggregation is performed only from user initiation, or an automatic mode of aggregation, whereby aggregation may be automatically performed periodically or upon the fulfillment of certain conditions (e.g., when the computing system is coupled with the storage device). In alternate embodiments, additional parameters not specifically identified may be requested and received (e.g., frequency of aggregation). Alternatively, some embodiments may not solicit (and receive) user input directed to each and every input provided herein. In still further embodiments, if no user input is received for one or more requested inputs, a default input may be asserted.

At step 1207, the user input (or default assertion) is created from the input received in steps 1201 through 1205. Creation of the configuration may comprise, for example, creating a data file specific to the computing device (e.g., by identifying the computing device with particularity) and comprising the user inputs from steps 1201 through 1205. In alternate embodiments, the configuration may be created via adding an entry specific to the computing device to a pre-existing list of configurations.

Finally, at step 1209, the configuration is stored. In one embodiment, the configuration (as a data file) may be stored in the local computing system. Alternatively, the configuration may be stored in the storage device with other configuration files corresponding to other computing devices. In other embodiments, a pre-existing collection of configurations may be appended with an entry comprising the configuration specific to the local computing device and stored.

Accordingly, enabling the creation of a customized configuration for each computing device allows a user to specifically customize the aggregation process for each device, thereby allowing a more precise aggregation system.

Aggregating Files from Multiple Computing Devices

Figure 13:
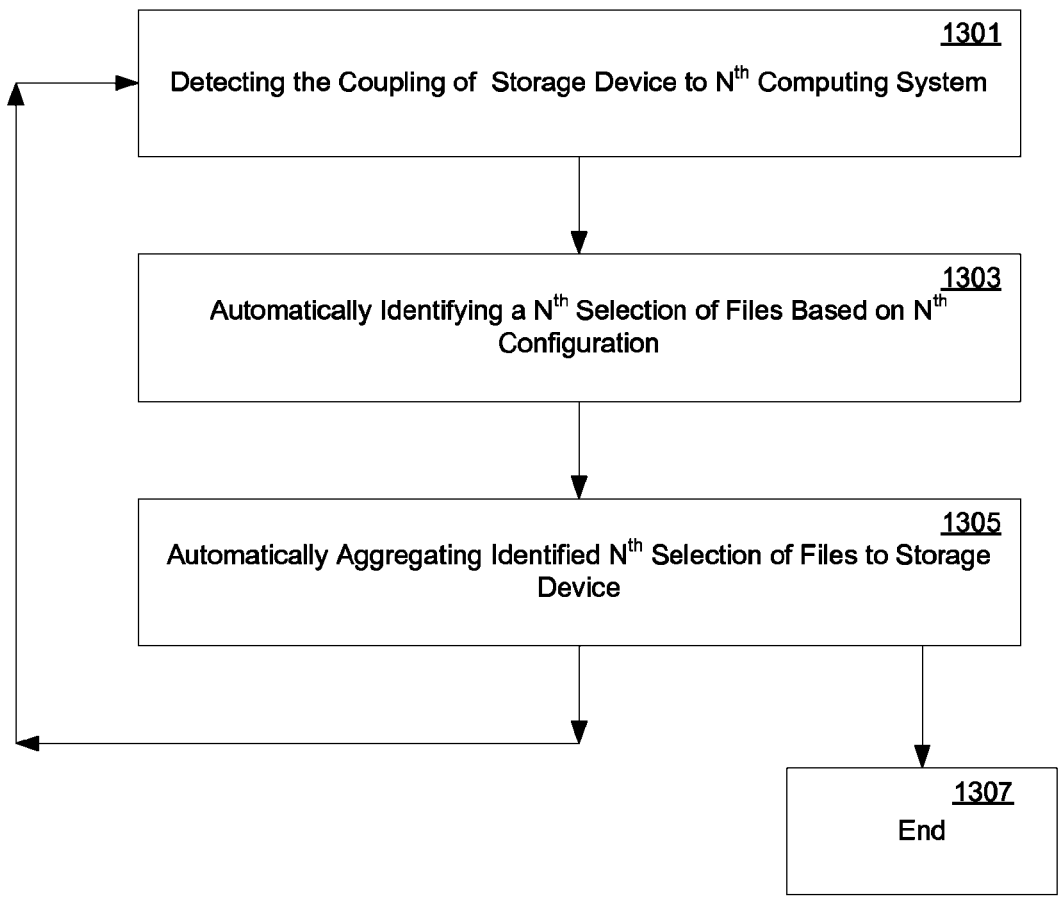
FIG. 13 depicts a flow chart of an exemplary computer-implemented process for automatically aggregating files from multiple computing systems to a storage device, in accordance with embodiments of the present invention.

With reference now to FIG. 13, a flow chart 1300 of an exemplary process for automatically synchronizing files between a storage device and a plurality of computing devices is depicted, in accordance with embodiments of the present invention. Steps 1301-1307 describe exemplary steps comprising the flowchart 1300 in accordance with the various embodiments herein described.

As depicted in FIG. 13, the coupling of a storage device to an $N^{th}$ (i.e. first, second, third, etc.) computing system is detected at step 1301. In one embodiment, detecting the coupling could comprise, for example, detecting the physical coupling of a cable (e.g., a USB, firewire, SATA, eSATA cable) in a port of the computing system. In further embodiments, detecting the coupling may be performed by, for example, receiving wirelessly transmitted data packets from the storage device to the computing device, e.g., within a local or global network.

At step 1303, a selection of files within the $N^{th}$ computing device is identified for aggregation, based on a configuration specific to the $N^{th}$ computing device. Identification may include, for example, scanning the $N^{th}$ computing device for pre-specified file types at pre-determined locations (as provided by the configuration). In one embodiment, step 1303 may be performed according to step 1103, as described above. In some embodiments, step 1303 may be performed automatically, e.g., when certain pre-set conditions are achieved. In certain configurations, step 1303 may even be performed immediately once the completion of step 1301 is detected (e.g., upon detecting the coupling of the storage device to the $N^{th}$ computing system). Alternatively, step 1303 may, according to some configurations, be performed only after receiving a request and/or command from a user.

At step 1305, the selection of files identified at step 1303 is aggregated (e.g., duplicated and transferred) into the storage device. In some embodiments, step 1305 may include scanning the storage device to determine the presence of duplicate files of the selection of files. If duplicate files are detected, a comparison to determine the most recently updated file may be performed (e.g., according to step 1107 and 1109 described above). In an alternate embodiment, files may be aggregated regardless of the presence of duplicate files.

These steps may then be performed again but for a different computing system (i.e. a second or third) as depicted by the arrow returning to step 1301. If there are no other computing systems to aggregate, the process can end at step 1307 (until a future aggregation is again needed). Accordingly, by enabling the aggregation of data files from multiple computing systems, the benefits described above with respect to automatic identification and aggregation of files from a computing system to a storage device may be advantageously extended to multiple computing systems.

Storage Device Configurations

Figure 14A:
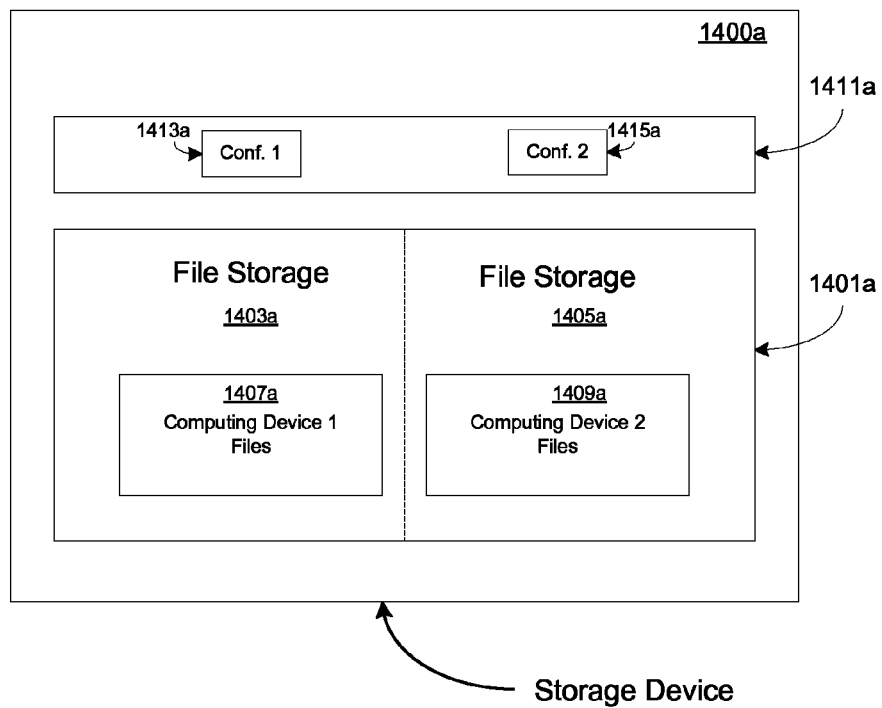
FIG. 14a depicts a block diagram of an exemplary file storage configuration in a storage device wherein aggregated files from multiple sources are stored separately, in accordance with embodiments of the present invention.
Figure 14B:
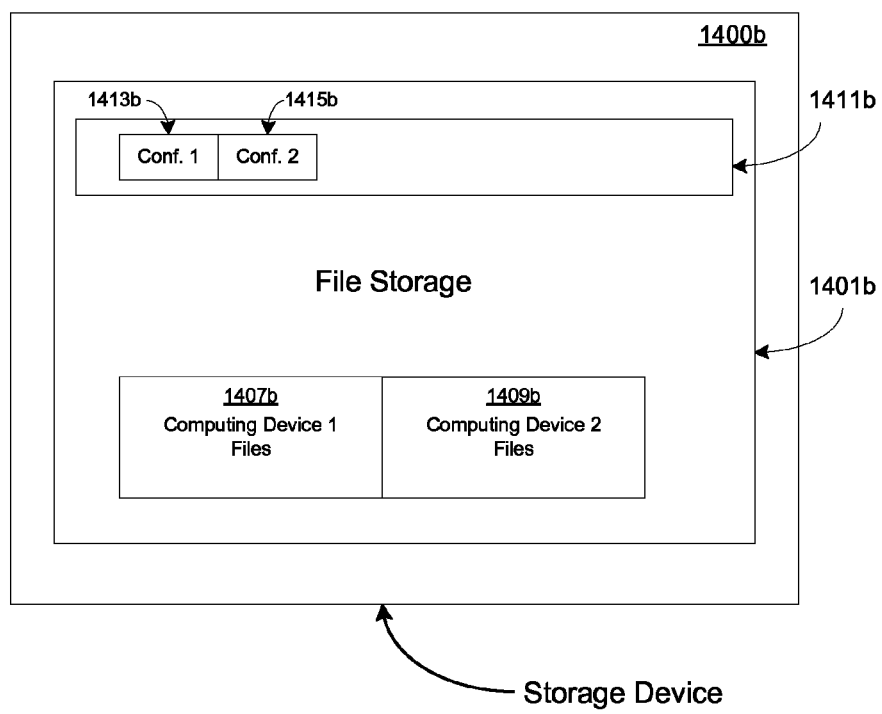
FIG. 14b depicts a block diagram of an alternate file storage configuration in a storage device wherein aggregated files from multiple sources are jointly stored, in accordance with embodiments of the present invention.

With reference now to FIGS. 14*a* and 14*b*, block diagrams 1400*a*, 1400*b* of exemplary file storage configurations in a storage device is depicted, in accordance with embodiments of the present invention. In a typical configuration, a storage device includes a file storage source (e.g., file storage source 1401*a*, 1401*b*) for storing data. In one embodiment, aggregated files from computing devices may be contained in the file storage source 1401*a*, 1401*b*. In one embodiment, aggregated files from multiple computing devices may be specifically delineated within a single file storage source (e.g., file storage source 1401*a*). According to these embodiments, the file storage source 1401*a* may have separate directories corresponding to each computing device. In further embodiments, the file storage source 1401*a* may be logically partitioned into two or more file storage sub-sources (e.g., partitions 1403*a*, 1405*a*), depending on the number of computing devices with files that have been aggregated to the storage device, with each computing device having a corresponding logical partition.

In typical embodiments, configurations specific to each computing device with aggregated files stored in the storage device may be stored in the storage device (unless otherwise deleted by a user). In one embodiment, the configurations may be kept separated from the file storage source, in a dedicated partition, for example (e.g., configuration partition 1411*a*). Thus, the dedicated partition 1411*a* may be accessed when a computing device is coupled to a computing device to access the configuration specific to that computing device. In further embodiments, the configurations may be stored on the computing device itself, e.g., along the same path as the application for generating the graphical user interface for configuring the storage device FIG. 14*b* depicts an alternate configuration, wherein aggregated files (e.g., files 1407*b*, 1409*b*) from multiple computing devices are not specifically delineated, but rather, share a single "pool" within the file storage source 1401*b*. In other embodiments, separate directories with correspondingly different paths may be created in the file storage source 1401*b* within the same logical partition. Likewise, configurations may be stored within the same logical source (e.g., file storage source 1401*b*), and, instead, may use alternate and/or additional pathing to remain separate from aggregated date files.

In an exemplary file storage configuration of an aggregation system, a configuration file specific to a first computing device can be stored in the first computing device, in accordance with embodiments of the present invention. In one embodiment, during an automated aggregation process, the first computing device references the configuration file to determine the parameters for aggregating files to the storage device. Once the parameters are determined, the corresponding files in the first computing device are aggregated to the storage device. In further embodiments, aggregation is performed in response to the detection of a communicative coupling of the first computing device with the storage device. The configuration works similar when a second computing device is aggregated, creating a configuration file specific to the second computing device stored in the second computing device.

Automatic Initiation of Aggregation Based on Coupling Storage Device

Figure 15:
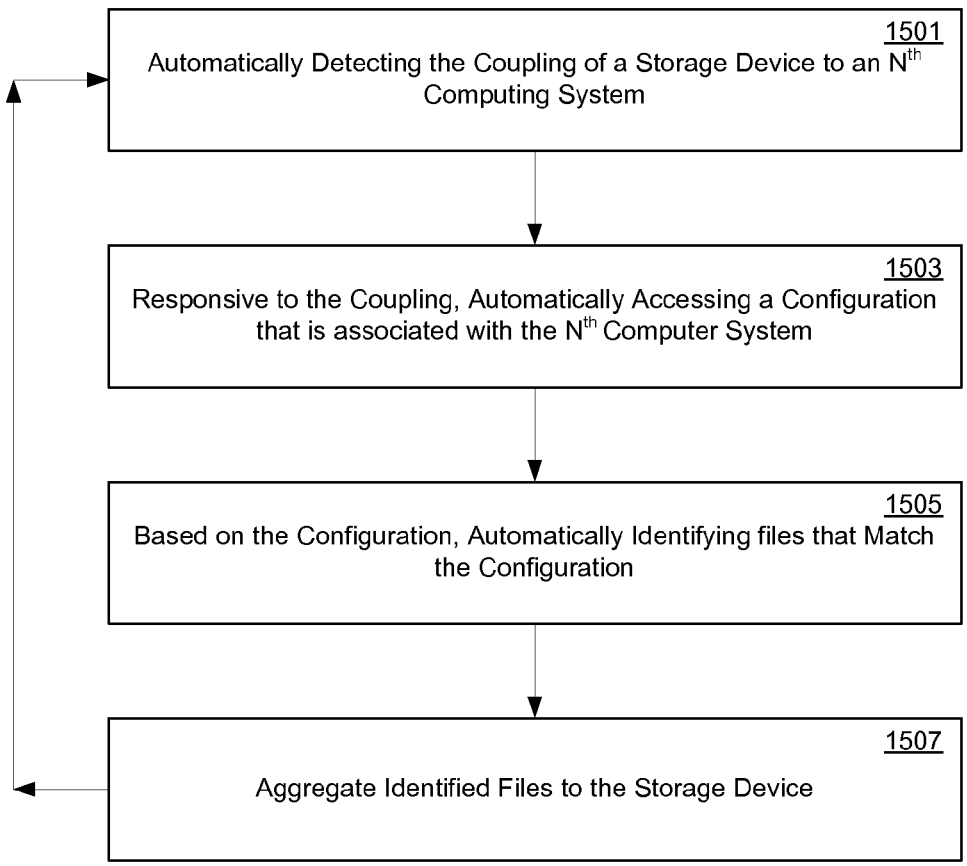
FIG. 15 depicts a flow chart of an exemplary computer-implemented process for automatically initiating an aggregation process by coupling a computing device to a storage device, in accordance with embodiments of the present invention.

With reference now to FIG. 15, a flow chart 1500 of an exemplary computer-implemented process for automatically initiating an automated aggregation process by coupling a computing system to a storage device is depicted, in accordance with embodiments of the present invention. As depicted in FIG. 15, the coupling of a storage device to an $N^{th}$ computing system (i.e., a first, second, third, etc.) is automatically detected at step 1501. In one embodiment, automatically detecting the coupling could comprise, for example, automatically detecting the physical coupling of a cable in a port of the first computing system. In further embodiments, automatically detecting the coupling may be performed by, for example, receiving wirelessly transmitted data packets from the storage device to the $N^{th}$ computing device, e.g., within a local or global network.

At step 1503, a pre-determined configuration specific to the $N^{th}$ computing system for the external storage device is determined and accessed. The configuration may comprise, for example, one or more paths to locations in the $N^{th}$ computing system and one or more file types. The configuration thus represents the location and types of files to be aggregated during the aggregation process. In varying embodiments, the configuration may be stored (e.g., as a file) within the $N^{th}$ computing device itself or, alternatively, in the storage device. Thus, determining the configuration may comprise accessing the data file within the storage device. In further embodiments, the configuration may be one of a list of configurations, each configuration being a distinct configuration specific to a computing device. Accordingly, determining the configuration specific to the local computing device may comprise parsing the list of configurations to locate the particular configuration corresponding to the first computing system.

In one embodiment, if no pre-determined configuration specific to the $N^{th}$ computing system is detected, a graphical user interface may be generated on the display of the first computing device to solicit user input directed to creating a configuration specific to the $N^{th}$ computing system. The configuration may include, for example, the plurality of paths and file types to be aggregated during an aggregation process. Once user input is received for this purpose, the configuration is stored so that subsequent couplings of the storage device to the $N^{th}$ computing device may automatically initiate aggregation without user input/manipulation. The configuration may be stored in the $N^{th}$ computing device itself or the storage device (or both). In further embodiments, the configuration may be added to the list of configurations specific to computing devices and stored in the storage device.

At step 1505, a selection of files within the $N^{th}$ computing device corresponding to the configuration is identified for aggregation, based on a configuration specific to the $N^{th}$ computing device. Identification may include, for example, scanning the $N^{th}$ computing device for specific file types at target locations (as provided by the configuration). In one embodiment, step 1505 may be performed according to step 1103, as described above.

At step 1507, the selection of files identified at step 1505 is aggregated (e.g., duplicated and transferred) into the storage device. In some embodiments, step 1507 may include scanning the storage device to determine the presence of duplicate files of the selection of files. If duplicate files are detected, a comparison to determine the most recently updated file may be performed (e.g., according to steps 1107 and 1109 described above). In an alternate embodiment, files may be aggregated regardless of the presence of duplicate files. In further embodiments, after the subsequent identification (step 1505) and aggregation (step 1507) of the selection of files in the $N^{th}$ computing system is performed, the locations (e.g., directories) within the $N^{th}$ computing system corresponding to the configuration is continuously and automatically monitored for the presence of any new or modified files corresponding to the configuration (e.g., having an appropriate file type) while the storage device is coupled to the $N^{th}$ computing system. If the presence of any new or modified files corresponding to the $N^{th}$ configuration within the locations is detected, the new or modified files will be automatically aggregated.

The method depicted in flow chart 1500 can then be applied to other computing systems (i.e., a second or third computing system) as shown by the return arrow. The automatically detecting a coupling step 1501 will be done every time a coupling with a computing system is made.

Thus, by enabling the automatic initiation of an aggregation process via the coupling of an storage device to a computing system, the aggregation process may be performed so as to advantageously provide an efficient and convenient file aggregation system without requiring user assistance or control, while still extending the ability to customize and particularly define the process to achieve desired aggregation results.

Although the subject matter has been described in language specific to structural features and/or process acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   automatically detecting a coupling of a storage device to a computing system, the storage device containing configurations of multiple computing devices, each of the configurations comprising a target path and a file type to aggregate that correspond to a different one of the multiple computing devices;
   responsive to the automatically detecting, automatically identifying, from the configurations, a configuration specific to the computing system;
   accessing the configuration specific to the computing system;
   responsive to the accessing, automatically identifying a plurality of files residing on the computing system corresponding to the configuration; and automatically aggregating the plurality of files to the storage device.

2. The method according to claim 1, wherein automatically detecting a coupling comprises:
   detecting an interface inserted into a port of the computing system.

3. The method according to claim 2, wherein the interface comprises a USB, SATA, eSATA or firewire interface.

4. The method according to claim 1, wherein automatically detecting a coupling comprises:
   detecting a wireless connection from the storage device.

5. The method according to claim 1 further comprising:
   continuously monitoring the target path, corresponding to the configuration specific to the computing system, to detect a presence of any new or modified files; and
   aggregating a new or modified file having a file type corresponding to the configuration specific to the computing system to the storage device,
   wherein the continuously monitoring and the aggregating are performed for so long as the storage device is coupled to the computing system.

6. The method according to claim 1, wherein the configuration is stored in the computing system.

7. The method according to claim 1, wherein the configuration comprises a plurality of paths to a plurality of locations in the computing system and a plurality of specific file types.

8. The method according to claim 1, wherein the storage device is an external storage device.

9. The method according to claim 1, further comprising:
   automatically detecting a second coupling of the storage device to a second computing system different than the computing system.

10. The method according to claim 9, further comprising:
    automatically identifying a second configuration specific to the second computing system.

11. The method according to claim 1, further comprising a plurality of configurations and wherein the automatically identifying a configuration comprises:
    parsing a plurality of configurations for the configuration specific to the computing system.

12. The method according to claim 1, wherein automatically detecting a coupling requires no input from a user.

13. The method according to claim 1, further comprising creating the configuration specific to the computing system by soliciting user input directed to creating the configuration specific to the computing system;
    receiving user input directed to the configuration specific to the computing system, the configuration comprising a plurality of target paths and a plurality of file types; and
    constructing the configuration specific to the computing system from the user input.

14. The method according to claim 13, wherein the soliciting user input comprises:
    querying a user through a graphical user interface presented on the display of the computing system for computing system specific information.

15. An electronic system comprising a processor coupled to a memory, the memory having computer readable code, which, when executed by the processor causes the system to implement a method of aggregating electronic files to a storage device, the method comprising:
    automatically detecting a coupling of a storage device to the system, the storage device containing configurations of multiple computing devices, each configuration comprising a plurality of target paths and a plurality of file types to aggregate corresponding to a different one of the multiple computing devices;
    responsive to the automatically detecting, automatically determining from the configurations, a particular configuration specific to the system;
    responsive to the automatically determining, automatically identifying a selection of files residing on the system corresponding to the particular configuration; and
    automatically aggregating to the storage device the selection of files.

16. The system according to claim 15, wherein automatically aggregating to the storage device comprises:
    automatically checking, in the storage device, if a duplicate file exists corresponding to a first file of the plurality of files;
    provided a duplicate file is detected, storing the first file to the storage device only if the first file is more recent than the duplicate file; and
    provided no duplicate file is detected, storing the first file to the storage device.

17. The system according to claim 15, wherein the selection of files comprises a plurality of media files.

18. The system according to claim 15, wherein the method further comprises:
    creating the particular configuration specific to the system in response to user input which defines the plurality of target paths and the plurality of file types.

19. An electronic system comprising:
    a first computing system comprising a plurality of files;
    a storage device operable to be coupled to the first computing system and containing configurations of multiple computing devices, each configuration comprising a target path and a file type to aggregate corresponding to a different one of the multiple computing devices; and
    a configuration file specific to the first computing system and comprising a plurality of file types, wherein, responsive to a coupling of the storage device to the computing system, the computing system is operable to access the configuration file from the configurations and, based thereon, is operable to automatically identify a subset of the plurality of files that match the plurality of file types and is further operable to aggregate the subset of the plurality of files to the storage device.

20. The electronic system according to claim 19, wherein the coupling of the storage device to the computing system is automatically detected, without user input, based on an interface cable inserted into a port or a wireless connection initiation.

* * * * *